(12) United States Patent
Coutandin et al.

(10) Patent No.: US 9,181,805 B2
(45) Date of Patent: Nov. 10, 2015

(54) GAS TURBINE BLADED ROTOR FOR AERONAUTIC ENGINES AND METHOD FOR COOLING SAID BLADED ROTOR

(75) Inventors: Daniele Coutandin, Turin (IT); Stefano Zecchi, La Loggia (IT)

(73) Assignee: AVIO S.p.A., Turin (IT)

( * ) Notice: Subject to any disclaimer, the term of this patent is extended or adjusted under 35 U.S.C. 154(b) by 827 days.

(21) Appl. No.: 13/331,863

(22) Filed: Dec. 20, 2011

(65) Prior Publication Data

US 2012/0321461 A1 Dec. 20, 2012

(30) Foreign Application Priority Data

Dec. 21, 2010 (IT) .............................. TO2010A1036

(51) Int. Cl.
*F01D 5/08* (2006.01)
*F01D 25/12* (2006.01)
*F01D 5/30* (2006.01)

(52) U.S. Cl.
CPC .............. *F01D 5/081* (2013.01); *F01D 5/3007* (2013.01); *F01D 25/12* (2013.01); *Y02T 50/676* (2013.01)

(58) Field of Classification Search
CPC ........... F01D 5/081; F01D 5/082; F01D 5/02; F01D 5/08; F01D 5/3007
USPC ....... 415/115; 416/95, 96 R, 97 R, 97 A, 181, 416/231 R
See application file for complete search history.

(56) References Cited

U.S. PATENT DOCUMENTS

| | | | | |
|---|---|---|---|---|
| 4,047,837 A | * | 9/1977 | Hueber et al. | 416/95 |
| 4,820,123 A | * | 4/1989 | Hall | 416/97 R |
| 4,898,514 A | * | 2/1990 | McCracken | 416/95 |
| 5,125,794 A | * | 6/1992 | Detanne | 415/115 |
| 5,584,659 A | * | 12/1996 | Schmidt | 416/221 |
| 5,941,687 A | * | 8/1999 | Tubbs | 416/97 R |
| 6,059,529 A | * | 5/2000 | Schiavo | 416/96 R |
| 6,974,306 B2 | * | 12/2005 | Djeridane et al. | 416/1 |
| 6,981,845 B2 | * | 1/2006 | Balland et al. | 416/96 R |
| 7,198,463 B2 | * | 4/2007 | Kanebako et al. | 415/175 |
| 8,113,784 B2 | * | 2/2012 | Gupta | 416/193 A |
| 8,529,209 B2 | * | 9/2013 | Belmonte et al. | 416/221 |
| 8,827,647 B1 | * | 9/2014 | Liang | 416/97 R |
| 8,845,288 B2 | * | 9/2014 | Tholath | 416/95 |
| 8,870,545 B2 | * | 10/2014 | Reghezza et al. | 416/220 R |
| 2007/0212228 A1 | * | 9/2007 | Digard Brou De Cuissart et al. | 416/97 R |
| 2012/0082568 A1 | * | 4/2012 | Tibbott et al. | 416/97 R |
| 2012/0321461 A1 | * | 12/2012 | Coutandin et al. | 416/1 |
| 2014/0219807 A1 | * | 8/2014 | Lattanzio et al. | 416/220 R |

FOREIGN PATENT DOCUMENTS

| | | | |
|---|---|---|---|
| DE | 2357326 A1 | * | 5/1975 |
| EP | 2436879 | | 4/2012 |
| FR | 2978078 A1 | * | 1/2013 |
| GB | 1209419 | | 10/1970 |

(Continued)

OTHER PUBLICATIONS

EPO Action dated Sep. 9, 2013 for EPO 11195046.5.

(Continued)

*Primary Examiner* — Edward Look
*Assistant Examiner* — Christopher R Legendre
(74) *Attorney, Agent, or Firm* — Davidson Berquist Jackson & Gowdey LLP

(57) ABSTRACT

A bladed rotor of a gas turbine for aeronautic engines is cooled by making an air mass flow through a plurality of passages, each one defined by a turbine disk on one side and by a root of a corresponding blade coupled to this turbine disk on the other, the incoming air of each passage being subdivided into two or more airflows and each flow being directed towards the turbine disk in a predefined direction.

17 Claims, 1 Drawing Sheet

(56) References Cited

FOREIGN PATENT DOCUMENTS

| | | |
|---|---|---|
| GB | 1605282 | 12/1987 |
| WO | WO 99/47792 | 9/1999 |

OTHER PUBLICATIONS

Italian Search Report mailed Jul. 1, 2011 in IT Appln. No. TO2010A 001036.

* cited by examiner

GAS TURBINE BLADED ROTOR FOR AERONAUTIC ENGINES AND METHOD FOR COOLING SAID BLADED ROTOR

The present invention relates to a gas turbine bladed rotor for aeronautic engines.

BACKGROUND OF THE INVENTION

As is known, a gas turbine for aeronautic engines generally comprises one or more rotating bladed rotors, each of which, in turn, comprises a turbine disk and a crown of blades that surround the turbine disk, with each one having its root retained in a peripheral seat or slot of the turbine disk.

The turbine disks are components that, as well as being subjected to high mechanical stress due to the high speeds of rotation, are subjected to high thermal stress, as they operate in an extremely high temperature environment due to close vicinity with the flow of hot gases that impact the blades.

For optimal turbine operation it therefore becomes necessary to control the operating temperature of these turbine disks, maintaining the operating temperature below a predefined or critical threshold value.

To that end, it is known to bleed a certain air mass air from the compressor associated with the turbine and to feed this air mass to the area of connection of the blades to the turbine disk. In the area of connection of the blades to the disk, the air is forced to flow through axial passages having lengths equal to the thickness of the disk, each one being defined by the bottom of the associated slot on one side, and by the root of the corresponding blade, on the other. In the course of passing through the passages, the air carries away part of the heat from the disk.

Although utilized, the described cooling method is found to be less than satisfactory and, in any case, unable to permit uniform cooling of the turbine disk. That which has just been described results from the fact that during its advance through the passages, the temperature of the air progressively rises and, in consequence, the turbine disk has variable point-to-point temperatures. In addition to this, in known solutions, the dimensions of the airflow duct and its height in particular are practically unchangeable, as they are set by the geometric characteristics and by the dimensions of the root-disk coupling.

The root-disk coupling also determines the geometry of the section of the air passage that, as is known, has a maximum radial size at the centre, i.e. along an axis of symmetry of the root, and drops to zero at the lateral root-disk contact points. This produces a concentration of air in the central area and minimum flow in the lateral areas, where cooling of the disk is consequently found to be less effective with respect to the central area.

SUMMARY OF THE INVENTION

The object of the present invention is that of making a gas turbine bladed rotor, the embodying characteristics of which enable the above described problems to be resolved in a simple and inexpensive manner and, in particular, to achieve effective and uniform cooling of the turbine disk.

According to the present invention, a gas turbine bladed rotor for aeronautic engines is made, the rotor comprising a rotating turbine disk comprising a crown of peripheral retaining seats, a crown of blades each one comprising a respective root housed and retained in a respective said retaining seat, and cooling means for said turbine disk, said cooling means comprising, for each blade, a passage for a cooling air mass obtained between the turbine disk and the corresponding said root, characterized in that said cooling means further comprise, for each said passage, distributing means housed in said passage to subdivide said air mass entering said passage into two or more airflows and guide means to direct each said airflow towards said turbine disk.

The invention also relates to a method for cooling a gas turbine rotor.

According to the present invention, a method is provided for cooling a gas turbine bladed rotor for aeronautic engines, the bladed rotor comprising a turbine disk and a crown of blades having respective attachment roots to the turbine disk and defining with the disk respective passages for cooling air, the method comprising the steps of displacing a cooling air mass through each of said passages, and being characterized in that the displacement of said cooling air mass comprises the steps of subdividing, within each said passage, the incoming air mass into two or more airflows and directing each said airflow towards said turbine disk.

BRIEF DESCRIPTION OF THE DRAWINGS

The invention will now be described with reference to the attached figures, which illustrate a non-limitative example of embodiment, where.

DETAILED DESCRIPTION OF THE INVENTION

Figure 1:
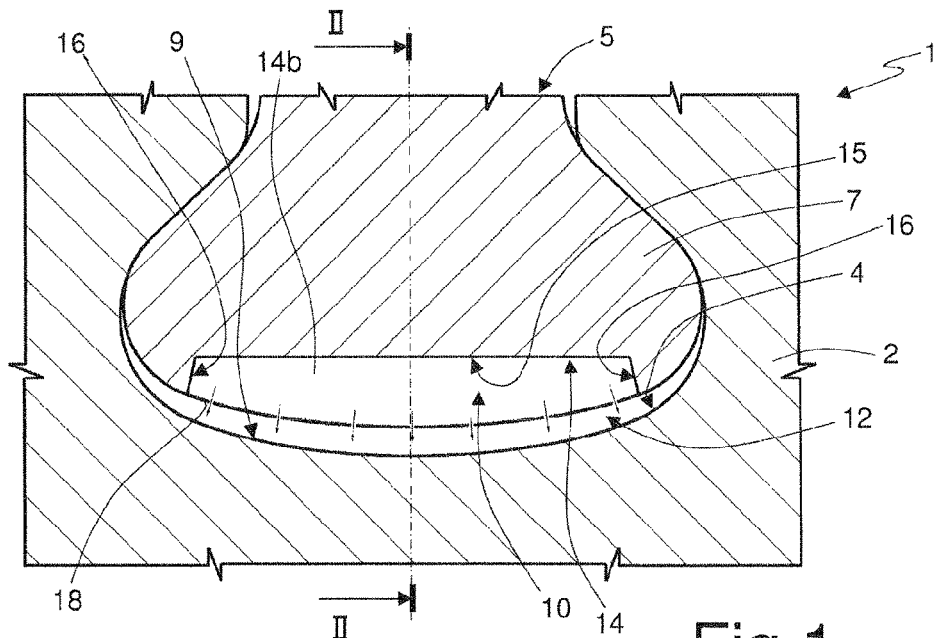
FIG. 1 shows, schematically and in radial semi-section, a preferred embodiment of a bladed rotor according to the present invention.
Figure 2:
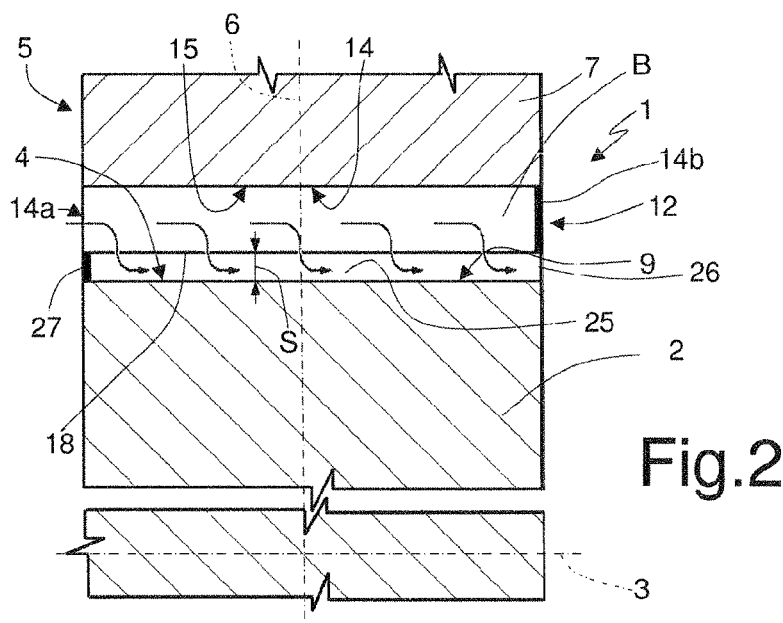
FIG. 2 is a schematic section along line II-II of FIG. 1.
Figure 3:
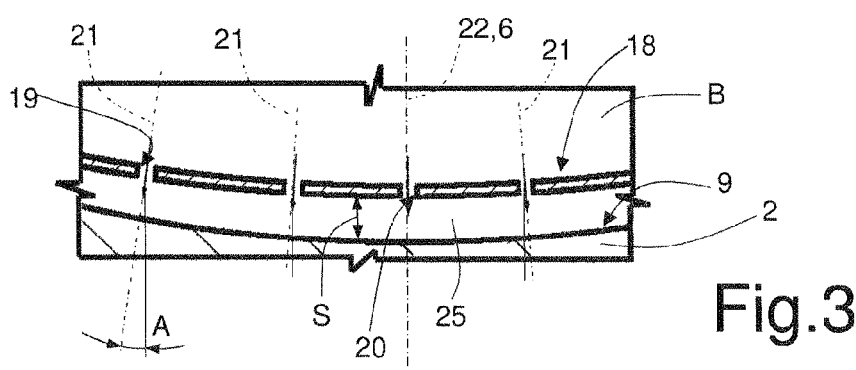
FIG. 3 shows, on a highly enlarged scale, a detail of FIG. 1.

In FIGS. 1 and 2, reference numeral 1 indicates, as a whole, a rotor of a gas turbine for aeronautic engines.

The rotor 1 comprises a turbine disk 2 rotating around a turbine axis 3 (FIG. 2) and, in turn, comprising a plurality of peripheral retaining seats 4, in themselves known and not described in detail, only one of which is visible in the attached figures. The rotor 1 also comprises a crown of blades 5 (only one of which is visible in the attached figures), each of which has its own axis 6 and comprises a root or lobe 7 housed and retained in a respective seat 4. The root 7 defines, with an inner surface 9 of the seat 4, an axial passage 10 through which, in use, a cooling air mass for the turbine disk 2 passes.

With specific reference to FIG. 1, a device 12 is provided inside passage 10 for distributing the incoming air mass and guiding the distributed air towards the turbine disk 2.

The device 12 comprises a recess 14 obtained inside the root 7 and defined by a bottom wall 15, which is flat in the particular example described, and facing an intermediate portion of surface 9 and two lateral walls 16 (FIG. 1). The recess 14 has an axial inlet 14a (FIG. 2) for taking in cooling air and is closed by an axial bottom wall 14b arranged on the air outlet side.

The recess 14 is partially closed, at the part facing surface 9, by a perforated element 18 shaped to distribute the air onto surface 9. The perforated element 18 is stably connected to the root 7 in a position facing surface 9, is connected to the lateral surface of the root 7 and with the recess 14 defines an air accumulation chamber, indicated by reference letter B.

The perforated element 18 comprises a plurality of calibrated holes 19 and 20, the axes 21 and 22 of which intersect a corresponding portion of surface 9. The position and distribution of the holes 19 and 20 and the orientation of the respective axes 21 and 22 are determined in a manner to achieve optimal air distribution in order to bring about uniform cooling of the parts impacted by the air.

Always with reference to the attached figures, the perforated element 18, with surface 9, defines a blind duct 25 having its own outlet 26 arranged on the same side and inside the wall 14b. The duct 25 has a thickness S and is closed in a substantially fluid-tight manner at the inlet 14a by a wall 27.

In use, the air mass fed into the chamber B through inlet 14a first pressurizes the chamber B and then flows into duct 25 through the holes 19 and 20. The holes 19 and 20 perform the dual function of subdividing the incoming air mass into a plurality of mutually independent airflows and directing or guiding each airflow in a given direction coincident with the axis of the associated hole and towards a corresponding area of bottom surface 9 of the retaining seat 4. In this way, the air mass present in chamber B is subdivided and oriented in predefined directions to obtain optimal and uniform cooling of the turbine disk 2. It has been verified experimentally that the described distribution or subdivision of the incoming air mass enables a desired temperature for the turbine disk 2 to be achieved along the entire path followed by the air, i.e. in a direction parallel to the axis 3 of the turbine, and the control of this temperature. Furthermore, with respect to known solutions, the subdivision of the incoming air mass enables cooling efficiency to be significantly increased and/or the air mass to be reduced. It was in fact possible in practice to observe how the different airflows obtained have a high heat removal capacity.

From the foregoing, it is evident that the subdivision of the incoming air mass and the distribution of this air on the turbine disk can be achieved using a different perforated element from the element 18 described by way of example or by providing, for example, two distinct portions or bodies with one performing the subdivision function and the other the guiding of the subdivided air.

Finally, the recess 14 could be obtained just partly inside the root 7.

The invention claimed is:

1. A gas turbine bladed rotor for aeronautic engines; the rotor comprising a rotating turbine disk comprising a crown of peripheral retaining seats, a crown of blades each comprising a respective root housed and retained in a respective said retaining seat, and a turbine disk cooling system comprising, for each blade, a blade passage receiving an incoming cooling air mass and for directing the flow thereof between the turbine disk and the corresponding root, wherein the cooling system includes an air distributor positioned in said blade passage in the form of a perforated element partially closing the blade passage and spaced from a bottom surface of the respective retaining seat, the perforated element having a plurality of spaced apart orifices to subdivide said air mass entering said blade passage into a plurality of airflows and to orient each of the plurality of subdivided air flows in a given direction coincident with an axis of an associated perforation and thereby to direct each said airflow out of the blade passage and into a duct located between the perforated element and the bottom surface.

2. The rotor according to claim 1, wherein, for each blade, the air distributor comprises an air chamber positioned at least partially in said root to house at least part of said incoming air mass.

3. The rotor according to claim 2, wherein, for each blade, the perforated element is arranged to close said air chamber.

4. The rotor according to claim 3, wherein, for each blade, the perforated element extends parallel to a bottom surface of the respective said retaining seat and defines with said bottom surface an outlet duct for said air mass having a substantially constant thickness.

5. The rotor according to claim 1, wherein, for each blade, the plurality of spaced apart orifices comprises two or more oriented guide holes extending in respective directions intersecting respective portions of the bottom surface of the respective retaining seat.

6. The rotor according to claim 1, wherein, for each blade, the plurality of orifices in the perforated element extend in respective directions forming an angle other than zero with a plane located in symmetry with an axis of the respective said blade and orthogonal to a rotation axis of said turbine disk.

7. The rotor according to claim 1, wherein the orifices comprise calibrated holes.

8. A gas turbine bladed rotor for aeronautic engines; the rotor comprising a rotating turbine disk comprising a crown of peripheral retaining seats, a crown of blades each comprising a respective root housed and retained in a respective said retaining seat, and a turbine disk cooling system comprising, for each blade, a passage for cooling air mass to flow between the turbine disk and the corresponding root, wherein the cooling system includes an air distributor positioned in said passage in the form of a perforated element having a plurality of spaced apart orifices to subdivide said air mass entering said passage into a plurality of airflows and to orient each of the plurality of subdivided air flows in a given direction coincident with an axis of an associated perforation and thereby to direct each said airflow towards the turbine disk, wherein the air distributor comprises an air chamber positioned at least partially in said root to house at least part of the incoming air mass.

9. A method for cooling a gas turbine bladed rotor for aeronautic engines, the bladed rotor comprising a turbine disk and a crown of a plurality of blades each having respective attachment roots to the turbine disk and defining with the turbine disk respective passages for cooling air, wherein the respective passages are formed at least partially within a bottom portion of the respective attachment roots, the method comprising the steps of:
    displacing an incoming cooling air mass through each of the respective passages, wherein the displacement of the cooling air mass comprises the additional steps of:
        subdividing, within each of the respective passages, the incoming cooling air mass into two or more airflows exiting the respective passages, and
        directing each said airflow towards the turbine disk.

10. The method according to claim 9, wherein, for each blade, the step of subdividing the air mass comprises the additional steps of feeding the air mass inside an air chamber positioned at least partially in the root and performing the subdividing at the outlet of the air chamber.

11. The method according to claim 10 wherein, for each blade, the step of subdividing the air mass into said flows includes the step of displacing the air mass through a perforated element arranged to partially close the air chamber.

12. The method according to claim 9 wherein, for each blade, an end of the respective passages at an end opposite an inlet thereto in the direction of flow is closed, and including the additional step of directing the cooling air mass into a duct positioned radially inwardly of the respective passages.

13. The method according to claim 12 wherein, for each blade the duct has an outlet arranged on the same side as the closed end of the respective passages.

14. The method according to claim 9 wherein, for each blade, the step of sub-dividing the cooling air mass includes forcing the cooling air mass through a plurality of orifices in a perforated member at least partially closing the respective passages.

15. The method according to claim 9 wherein each of the respective passages is partially closed by a perforated member and wherein the two or more sub-divided air flows are established by forcing the cooling air mass through the respective perforated member, and further including the step of receiving the sub-divided air flow into a separate duct defined on an opposite side of the respective perforated member.

16. The method according to claim 15 wherein the respective separate ducts have a closed end opposite from the closed end of the respective passages.

17. A method for cooling a gas turbine bladed rotor for aeronautic engines, the bladed rotor comprising a turbine disk and a crown of blades each having respective attachment roots to the turbine disk and defining with the turbine disk respective passages for cooling air, the method comprising the steps of:
  displacing a cooling air mass through each of the respective passages, wherein the displacement of the cooling air mass comprises the additional steps of:
  subdividing, within each said passage, the incoming cooling air mass into two or more airflows, and
  directing each said airflow towards the turbine disk,
  wherein the step of subdividing the air mass comprises the step of feeding the air mass inside an air chamber positioned at least partially in said root, which is performed at an outlet of said chamber.

* * * * *